United States Patent [19]

Cox et al.

[11] Patent Number: 4,520,392
[45] Date of Patent: May 28, 1985

[54] TELETEXT RECEPTION INDICATOR

[75] Inventors: Charles M. Cox, Buffalo Grove; Charles Heuer, Glencoe, both of Ill.

[73] Assignee: Zenith Electronics Corporation, Glenview, Ill.

[21] Appl. No.: 471,978

[22] Filed: Mar. 4, 1983

Related U.S. Application Data

[63] Continuation-in-part of Ser. No. 323,530, Nov. 23, 1981, abandoned.

[51] Int. Cl.³ ............................................. H04N 7/04
[52] U.S. Cl. ................................................... 358/147
[58] Field of Search ................. 358/142, 147, 192.1, 358/257

[56] References Cited

U.S. PATENT DOCUMENTS

| | | | |
|---|---|---|---|
| 3,518,365 | 6/1970 | Chaddha | 358/192.1 |
| 4,232,394 | 11/1980 | Fujishima | 358/192.1 |
| 4,251,836 | 2/1981 | Moreau | 358/257 |
| 4,303,940 | 12/1981 | Ciciora | 358/147 |

OTHER PUBLICATIONS

Insam et al., An Integrated Teletext and Viewdata Receiver, The Sert Journal, vol. 11, pp. 210–213, Oct. 1977.

Norris et al., The Tifax XMII Teletext Decoder, Texas Instruments.

Daniels, Wireless World Teletext Decoders 3-Line and Clock Dividers, Wireless World, vol. 82, No. 148, pp. 37–42, Jan. 1976.

Primary Examiner—John C. Martin
Assistant Examiner—David E. Harvey

[57] ABSTRACT

An indicator is described for alerting a television viewer to the fact that a teletext signal is being received. In the preferred embodiment, the indicator includes a control which senses the detection of the framing code associated with the received teletext signal to actuate an indicator lamp.

7 Claims, 5 Drawing Figures

TELETEXT RECEPTION INDICATOR

CROSS-REFERENCE TO RELATED APPLICATION

This application is a Continuation-In-Part of application Ser. No. 323.530, now abandoned, filed Nov. 23, 1981.

BACKGROUND OF THE INVENTION

This invention relates generally to teletext receiving systems. It is particularly directed to a receiving system capable of indicating to a user the receipt of a valid teletext signal.

Teletext is a generic term for a television based communication technique which uses the vertical blanking interval of a broadcast television signal for transmission of text and graphics information. Systems implementing this technique are presently operational in various countries, such as in England where teletext formatted text and graphics material is transmitted in digitally encoded form on lines 17, 18, 330 and 331 of their 625 line system. Television receivers equipped with teletext decoders process the transmitted data for forming a display of the text and graphics on their viewing screens.

In normal operation, a television receiver which is equipped to receive and display teletext information will generate a display of the teletext information only upon command by the television viewer. Lacking such a command, the television receiver displays the video associated with the conventional television broadcast signal. Any teletext information being simultaneously broadcast is not visible to the viewer, as that information is encoded in the vertical blanking interval of the television signal which is blanked from the viewing screen. Hence, while the television receiver is displaying a conventional broadcast signal, the viewer is ordinarily unaware that the teletext signal is being simultaneously received. The viewer, therefore, may miss a teletext transmission which he wishes to view, and/or record on a video tape recorder or the like.

Accordingly, it is a general object of the invention to provide an automatic indicator which indicates the receipt of a teletext transmission.

It is another object of the invention to provide such an indicator which is responsive only to a valid teletext signal and which is unresponsive to spurious signals which may intermittently appear as a teletext signal.

It is a further object of the invention to provide a control signal which responds to a valid teletext signal for automatically actuating the recording thereof.

BRIEF DESCRIPTION OF THE FIGURES

The objects stated above and other objects of the invention are set forth more particularly in the following detailed description and in the accompanying drawings, of which.

DESCRIPTION OF THE PREFERRED EMBODIMENT

Figure 1:
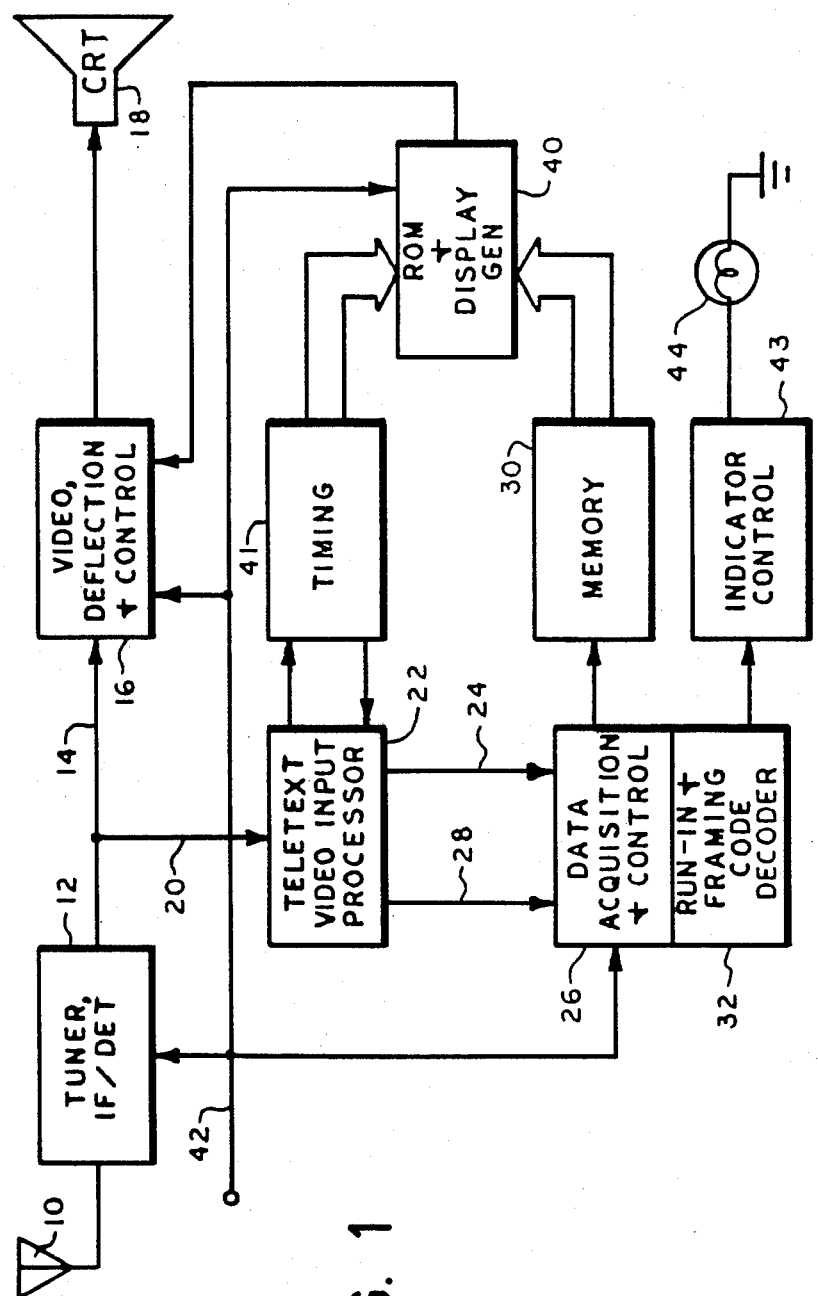
FIG. 1 is a block diagram of a television receiver embodying a teletext indicator according to the invention.

The teletext indicator described herein may be embodied in a television receiver which incorporates a teletext decoder. Alternatively, it may be embodied in a teletext decoder which is separate from, but which may be wired to, a television receiver. FIG. 1, to which reference is now made, is illustrative of both situations.

The television receiver shown in FIG. 1 includes an antenna 10 which carries broadcast television signals to a tuner, an IF (intermediate frequency) stage, and detector block 12. The output of the block 12 includes detected video signals which are coupled via a lead 14 to a video, deflection and control block 16. The output of the block 16 typically includes R, G and B video signals which are applied to a cathode ray tube 18. Deflection signals for synchronizing the raster of the tube 18 with incoming television signals are also developed by the block 16.

For processing teletext signals which are received by the antenna 10, the output of the tuner, IF and detector block 12 is coupled via a lead 20 to a teletext decoder. This decoder includes a video input processor 22 whose function is basically to separate out and process the teletext signal for use by the other blocks of the decoder. One output of the processor 22 is a data signal which is coupled via a lead 24 to a data acquisition and control block 26. The other illustrated output of the processor 22 is a clock signal which is coupled to the block 26 via a lead 28.

At this juncture, it should be understood that a user may select one of the multiple pages of transmitted teletext data for display on the CRT 18. The function of the block 26 is to recognize the user-requested page and to load the data representing that page into a memory 30.

Associated with the block 26 is a run-in and framing code decoder 32 for recognizing the clock run-in and framing code associated with a transmitted teletext signal. The clock run-in and framing code form part of each row of the teletext information which is transmitted during the television receiver's vertical blanking interval. Each such row is encoded with 360 serially transmitted bits arranged in 45 bytes of eight bits each and commonly referred to as a data row. Twenty four data rows comprise a page which represents the amount of information normally displayed on the viewing screen of a television receiver equipped with a teletext decoder, the pages being arranged into groups of 100, each group denoting a magazine.

Figure 2:
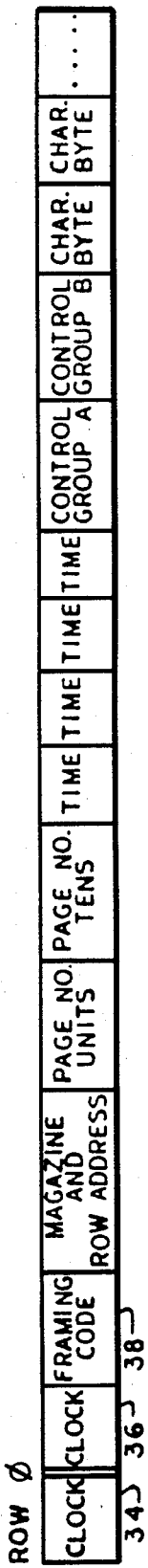
FIG. 2 illustrates the format of the data row zero of an exemplary teletext signal.

Row 0 of each page, shown in FIG. 2, is referred to as a page-header and includes three initial bytes, two clock run-in bytes 34 and 36, and a framing code byte 38 which serve to synchronize the bit and byte recovery operation in the receiver. The next two bytes of the page-header row are encoded for identifying the magazine and row address, while the page number code is contained within the next two bytes. The next four bytes are reserved for time codes followed by two control group codes. The last 32 bytes of the page-header row are character bytes, each of which comprises an ASCII code representing a selected text or graphics character.

The format of each of the remaining 23 rows is identical in that the first three bytes contain synchronization information, the next two bytes contain magazine and row address information, and the last 40 bytes contain character information.

The method by which a teletext decoder acquires a transmitted teletext signal is known to those skilled in the art and need not be discussed herein. Suffice it to say that the clock run-in and framing codes identify a valid teletext signal. Once those codes have been received and identified, and after the teletext decoder has found a match between the incoming teletext data and the data selected by the user, that data is stored in the memory 30.

Referring again to FIG. 1, the data stored in memory 30 is coupled to a ROM (Read Only Memory) and display generator 40 for coupling to the CRT 18 R, B and G signals representing the stored teletext data. Typically, twenty four rows of teletext characters are displayed on the CRT's viewing screen at one time.

The remaining block of the teletext decoder is a timing block 41 which functions as a time base generator to synchronize the operation of the other components in the teletext decoder. In addition, a control bus 42 is coupled to the tuner and IF/detector block 12, to the deflection and control block 16, and to blocks 26 and 40 in the teletext decoder. A signal applied to the bus, upon command by the user, selects display of a conventional television broadcast, or selects display of chosen pages of teletext data.

The teletext decoder components and their operation described above are conventional and are described in more detail in U.S. application Ser. No. 238,510, filed Feb. 26, 1981, the pertinent teachings of which are incorporated herein by reference.

It will be evident from the foregoing that the display of teletext information depends on the user selecting the teletext mode and inputting data representative of the information to be displayed, i.e., page number, and the decoder finding a match with the data requested in the data train received by the processor 22. Generally, however, the user is unaware of when teletext information is being received.

To overcome this problem, the present invention provides control means in the form of an indicator control 43 which responds to the decoder's sensing a valid teletext signal for generating a control signal. Indicating means, in the form of a light 44 or any other user-sensible device, responds to the control signal for indicating to the user that a valid teletext signal is being received. Thus, when the light 44 is energized, the user is made aware that he may call for teletext data to be displayed on the CRT 18. In addition, the control signal developed by indicator control 43 may also be used to automatically actuate a device to record received teletext information. As described in more detail below, these functions are effected by the indicator control 43 sensing that run-in and framing code decoder 32 has detected the teletext framing code.

Figure 3:
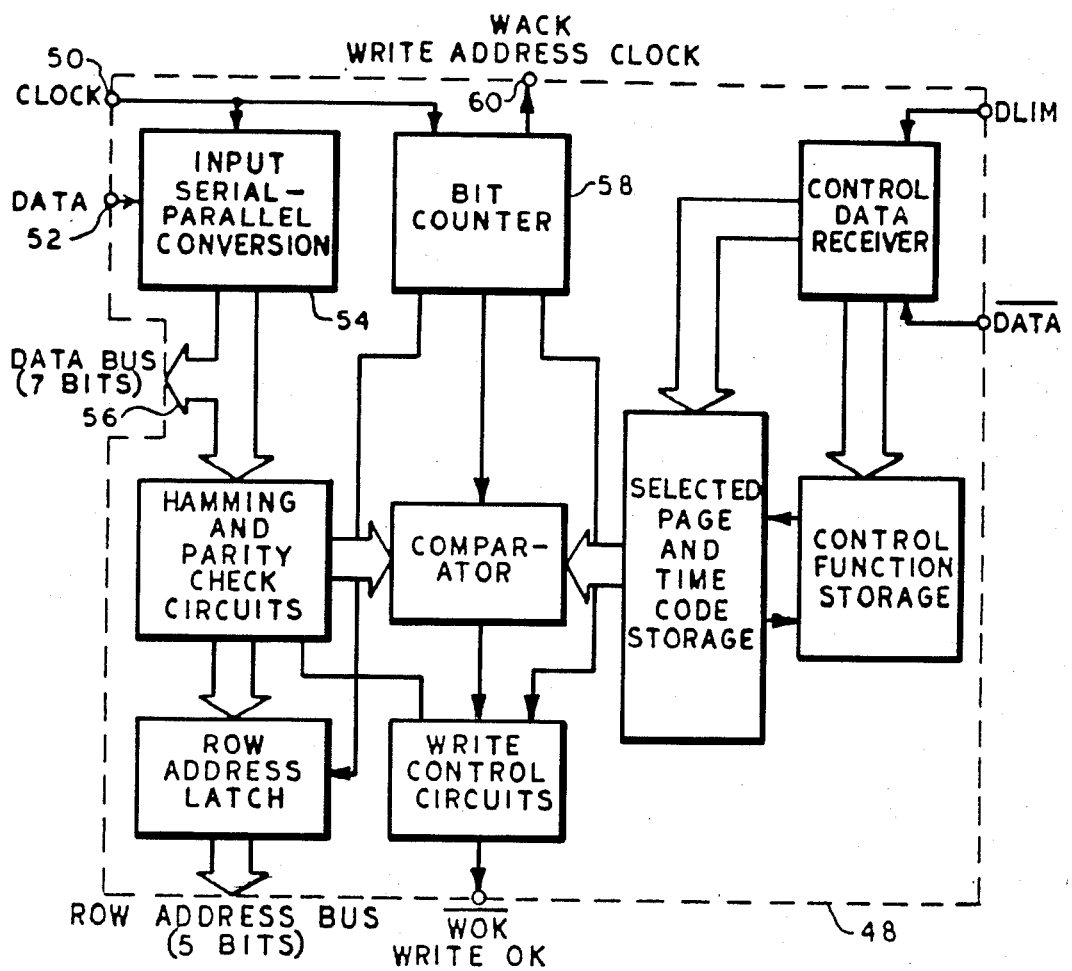
FIG. 3 is a more detailed representation of the data acquisition and control block and the run-in and framing code decoder shown in FIG. 1.

To more fully explain the operation of the indicator control 43, the operation of the data acquisition and control block 26 and the run-in and framing code decoder 32 are first described briefly with reference to FIG. 3. The illustrated block 48 in FIG. 3 serves the functions of blocks 26 and 32 in FIG. 1, and is particularly adapted for use with the British teletext system. It will be understood, however, that the invention is not limited to use with the British teletext system, since all teletext systems presently proposed employ a framing code.

The block 48 receives a clock signal at input terminal 50 and data signals at input terminal 52, all of which are generated by the processor 22 (FIG. 1). These inputs are applied to an input serial-parallel conversion block 54 which develops, at bus 56, a seven bit parallel output representing the framing code of a received teletext signal. As described below, this framing code data at bus 56 is used to generate an indication that a valid teletext signal is being received. The remaining components of the block 58 are conventional and do not relate directly to the invention. Hence, those components will not be described.

Figure 4:
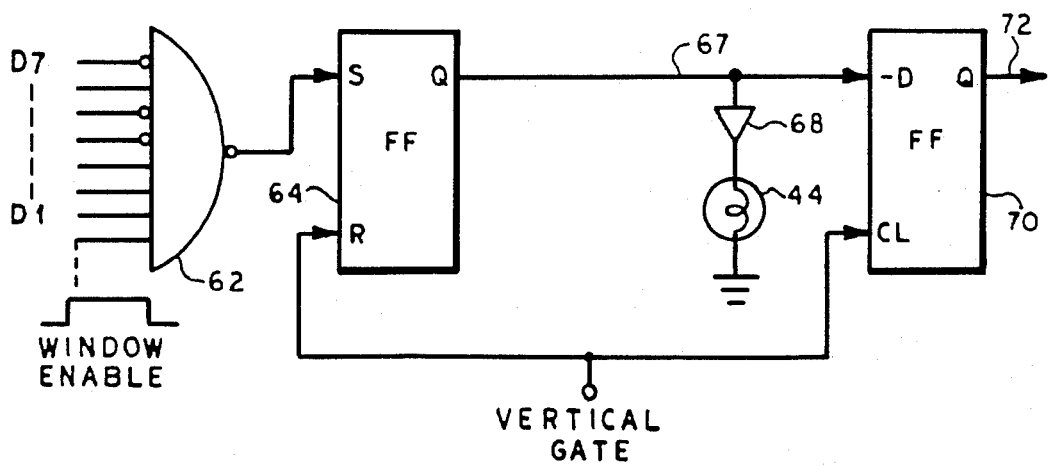
FIG. 4 is a circuit diagram of an embodiment of the indicator control shown in FIG. 1.

Referring now to FIG. 4, a detailed circuit diagram is shown of a preferred embodiment of the indicator control 43. Included in this control is a NAND gate 62 whose inputs comprise seven data bits D1-D7. Another input to the gate 62, a horizontal rate window enable signal, may also be included. The operation of the gate 62 without the window enable signal is described first.

The seven bits D1-D7 represent the decoded framing code and are received from the bus 56 in FIG. 3. In the British system, bits D1-D3 and D6 are high and bits D4, D5 and D7 are low when a valid framing code is detected. Hence, the output of gate 62 is driven low by the presence of a valid framing code.

Although the output of the gate 62 could be used to actuate an indicator, it is possible that random data could also cause the gate 62 to fire. To account for this possibility, the output of the gate 62 is coupled to the SET input of a flip-flop 64, and vertical rate gate pulses, developed conventionally either by the television receiver or the teletext decoder, are applied to its RESET input. With this arrangement, a vertical gate pulse resets the Q output of flip-flop 64 to "not true" and a low output from the gate 62 (indicative of the presence of a framing code) sets the Q output to "true". Thus, the duration of an incorrect "true" signal at the Q output of flip-flop 64 is limited to one vertical field or less.

The Q output of flip-flop 64 is the control signal which is used to energize the indicator light 44 via a lead 67 and a driver amplifier 68. Hence, the indicator light becomes energized when the control signal is driven to a high level by the detection of a framing code.

The nature of the control signal on lead 67 is such that it is in a high state when a framing code is sensed, except for brief, periodic intervals when the vertical gate pulses drive the control signal low. Although these brief low states at the output of flip-flop 64 will usually not adversely affect the operation of the light 44, the output of the flip-flop 64 may be converted to a continuous DC state by the inclusion of an edge triggered flip-flop 70. This flip-flop preferably receives, at its D input, the Q output of flip-flop 64. Vertical gate pulses are applied to the clock input of flip-flop 70. Thus, a latched DC indication of the status of flip-flop 64 is developed at the Q output (lead 72) of flip-flop 70. This signal at lead 72 may be used to actuate another lamp or the like to indicate that a teletext signal is being received. In addition, the signal on lead 72 may be used to automatically actuate a recorder to record the received teletext data.

In some applications, it may be desired to employ what is known as a "windowed framing code" rather than merely the framing code to energize the indicator light. As used herein, "windowed framing code" means framing code data which occurs during a horizontal rate time window during which the framing code is transmitted. The advantage of using the windowed framing code is that a higher degree of reliability is attained as compared to the use of a non-windowed framing code. Noise or other extraneous signals which might otherwise appear as framing code data are much less likely to trigger a false teletext indication if the framing code is gated by an appropriate time window during the interval when a true framing code is expected.

In conventional teletext decoders, the decoder itself generates a windowed framing code. That code may be applied to the set input of the flip-flop 64 for actuating the indicator lamp 44. Alternately, a windowed framing code may be generated by applying the illustrated window enable signal to one input of the gate 62. This window enable signal is a horizontal rate pulse which is generated internally of a conventional teletext decoder and occurs when the framing code is expected. By applying this window enable signal to the gate 62, the output of this gate constitutes a windowed framing code. Thus, extraneous signals which may resemble a framing code, and which are most likely to occur outside the window during which gate 62 is enabled, do not trigger the indicator light 44. In other respects, the circuitry of FIG. 4 operates as described previously.

Figure 5:
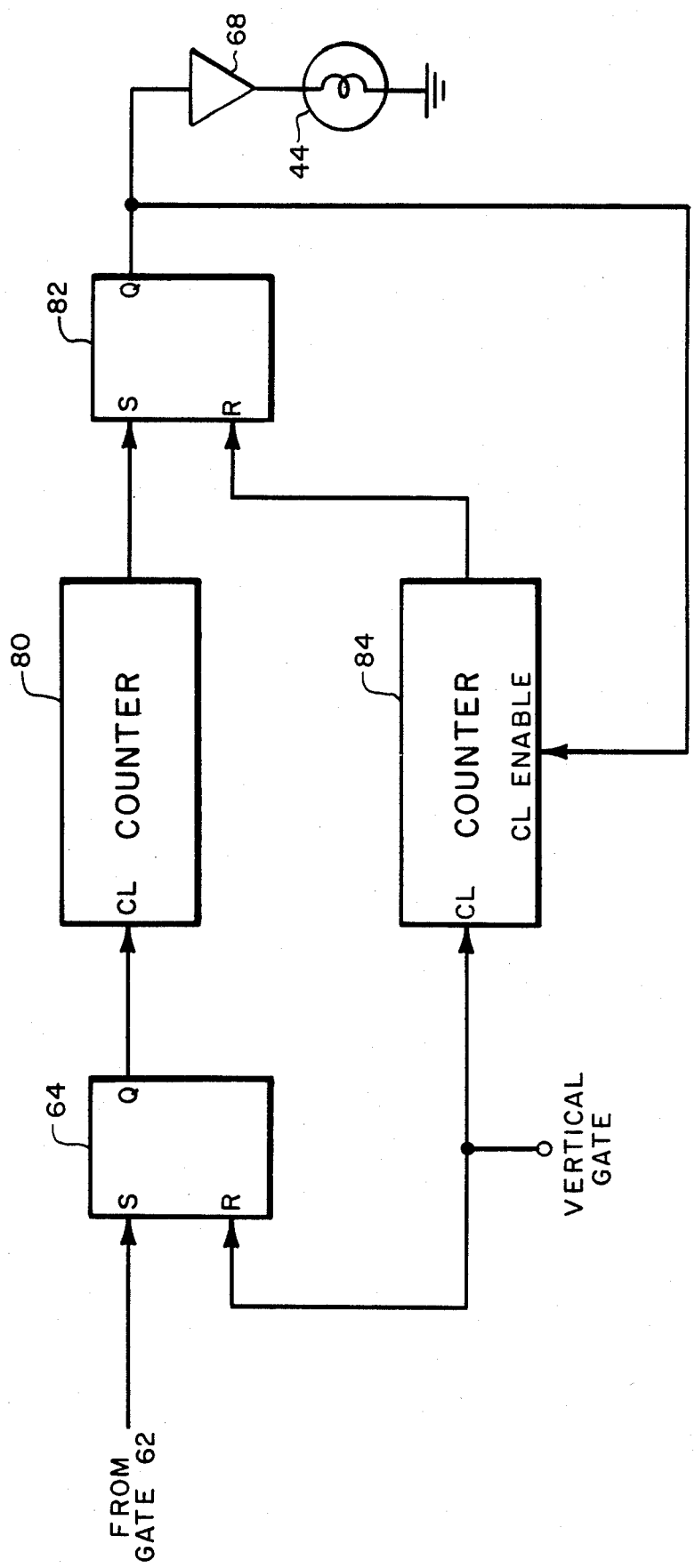
FIG. 5 is a circuit diagram of a further embodiment of the indicator control shown in FIG. 1.

FIG. 5 illustrates a confidence counting arrangement which may be used with the circuit of FIG. 4 to further increase confidence in the operation of the indicator control 43. The confidence counting arrangement includes a first 16-stage counter 80 whose CLOCK input is connected to the Q output of flip-flop 64 and whose output is connected to the SET input of a flip-flop 82. The vertical rate gate pulses are applied to the RESET input of flip-flop 64 as before and are additionally applied to the CLOCK input of a second 16-stage counter 84 whose output is connected to the RESET input of flip-flop 82. The Q output of flip-flop 82 is coupled for energizing the indicator light 44 and also for enabling counter 84.

In operation, assume that flip-flop 82 is initially in a "not true" state so that its Q output is low whereby indicator light 44 is off and counter 84 is disabled. Upon detection of a valid framing code, gate 62 will set flip-flop 64 thereby clocking counter 80, flip-flop 64 being subsequently reset about one field later by a vertical rate gate pulse. After being so clocked sixteen times, the ouptut of counter 80 will go high setting flip-flop 82 and thereby energizing indicator light 44. Also, the high Q output of flip-flop 82 will enable counter 84 which will therefore begin counting in time synchronism with counter 80. The ouptut of counter 84 will therefore go high after the next sixteen video fields resetting flip-flop 82 and thereby extinguishing indicator light 44 as well as disabling the counter. If, however, a strong teletext signal is being received, the output of counter 80 will go high about one vertical interval later again setting flip-flop 82 for energizing indicator light 44 and enabling counter 84. Thereafter, the foregoing process is again repeated so that, in response to a strong teletext signal, the Q output of flip-flop 82 is continuously high except for a period of about one vertical interval during each sixteen video fields. As a consequence, indicator light 44 provides a relatively steady indication to the effect that a teletext signal is being received.

As explained above, flip-flop 82 is reset by counter 84 sixteen video fields after it has been set in response to counter 80 detecting sixteen state changes of flip-flop 64 (whether due to valid framing code detection signals or to extraneous noise). In the case of a strong teletext signal this resetting of flip-flop 82 will not be noticeable to the viewer since the flip-flop is quickly thereafter again set by counter 80. However, in the case where counter 80 is clocked sixteen times over a relatively long time interval, for example—in response to a weak teletext signal or to spurious noise pulses, the subsequent resetting action of counter 84 will insure that indicator light 44 is quickly extinguished so as not to create a false teletext signal reception indication. Thus, for a weak teletext signal, indicator light 44 will blink at a rate depending on the strength of the signal and for an extremely weak signal, as well as for spurious pulses which may clock counter 80, the illumination of the indicator light will be barely noticeable to the viewer.

From the foregoing, it will be apparent that the described indicator responds only to valid teletext signals for alerting a user to the receipt of such signals. Virtually all spurious signals are ignored. Having thus been alerted, the user may command the television receiver to display selected teletext data, or the indicator may be used, as previously described, to automatically command a recorder to record the received teletext data.

Although the teletext indicator has been described in terms of a preferred embodiment, it will be obvious to those skilled in the art that many alterations and modifications may be made without departing from the invention. Accordingly, it is intended that all such alterations and modifications be considered as within the spirit and scope of the invention as defined by the appended claims.

We claim:

1. For use with a teletext decoder which decodes teletext signals having a framing code, a teletext indicator, comprising:
control means associated with the teletext decoder and responsive to the decoder's detection of a framing code for generating a control signal, said control means being responsive to vertical rate gate pulses for resetting the control signal; and
indicating means responsive to the control signal for indicating the receipt of a valid teletext signal.

2. A teletext indicator as set forth in claim 1 wherein said control means includes first gate means responsive to framing code data developed by the decoder for generating a first output, and second gate means responsive to said first output for developing a second output signal indicative of the receipt of a teletext signal and responsive to vertical rate gate pulses for resetting the second output signal.

3. A teletext indicator as set forth in claim 2 wherein said first gate means is enabled by a window signal which occurs concurrently with a valid framing code.

4. A teletext indicator as set forth in claim 1 further including means for latching the control signal in response to the vertical rate gate pulses to develop a further signal useful for automatically actuating recording of teletext data.

5. For use with a teletext decoder which decodes teletext signals having a framing code, a teletext indicator comprising:
control means comprising first counting means responsive to the detection of N framing codes by the teletext decoder for initiating a control signal and second counting means responsive to N vertical rate gate pulses developed immediately following the generation of a control signal for resetting the control signal; and indicating means responsive to the control signal for indicating the receipt of a valid teletext signal.

6. For use with a teletext decoder which decodes teletext signals having a framing code, a teletext indicator, comprising:

a gate for sensing the decoder's detection of a framing code;

means for applying to said gate a window enable signal which occurs concurrently with a valid framing code, thereby to provide a first output signal corresponding to a windowed framing code;

a first flip-flop responsive to said first output signal for developing a control signal;

means for resetting the flip-flop at a vertical rate; and means responsive to the control signal for indicating the receipt of a valid teletext signal.

7. For use with a teletext decoder which decodes teletext signals having a framing code, a teletext indicator comprising:

a gate for sensing the decoder's detection of a framing code;

means for applying to said gate a window enable signal which occurs concurrently with a valid framing code, thereby to provide a first output signal corresponding to a windowed framing code;

a first flip-flop responsive to said first output signal for developing a first control signal;

means for developing a vertical rate gate signal;

means for resetting said first flip-flop at a vertical rate in response to said vertical rate gate signal;

first counting means responsive to the development of N first control signals for developing a second output signal;

a second flip-flop responsive to said second output signal for developing a second control signal;

second counting means enabled by said second control signal for counting N vertical rate gate signals for developing a reset control signal coupled for resetting said second flip-flop; and means responsive to the second control signal for indicating the receipt of a valid teletext signal.

* * * * *